F. LYTLE.
THRESHING MACHINE.
APPLICATION FILED MAR. 11, 1908.
926,201.
Patented June 29, 1909.
2 SHEETS—SHEET 1.
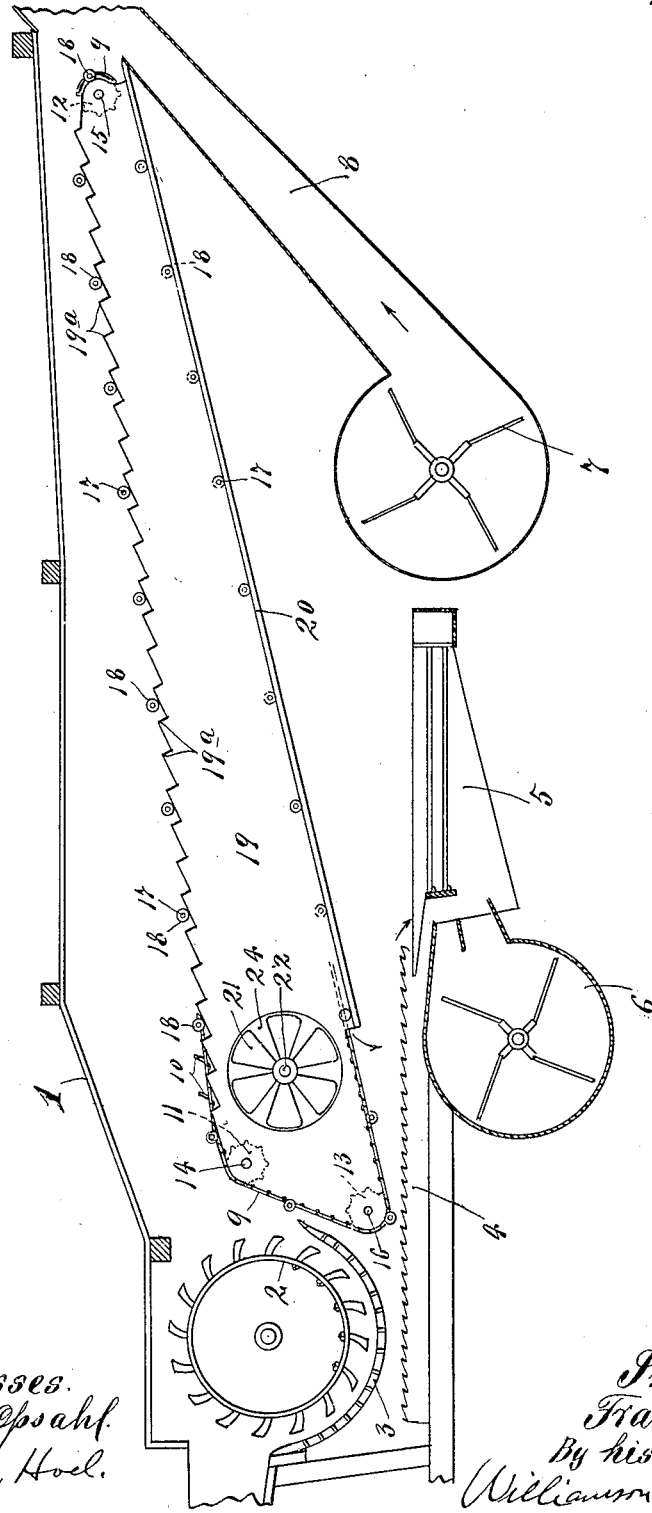
Witnesses
A. H. Opsahl
Malie Hoel.
Inventor.
Frank Lytle
By his Attorneys
William Merchant F. LYTLE.
THRESHING MACHINE.
APPLICATION FILED MAR. 11, 1908.
926,201.
Patented June 29, 1909.
2 SHEETS—SHEET 2.
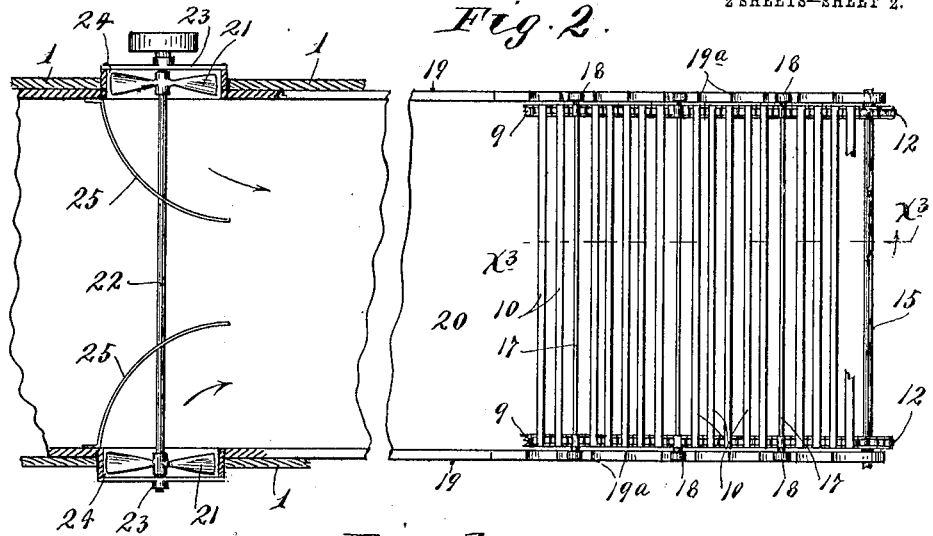
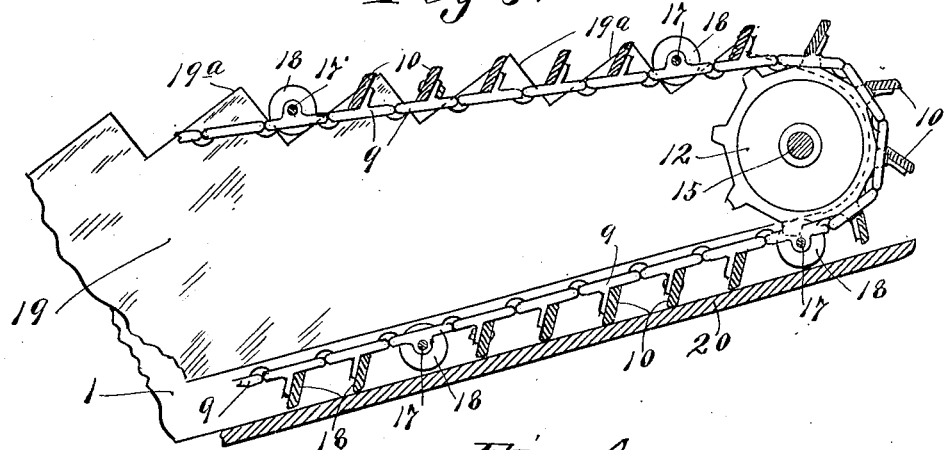
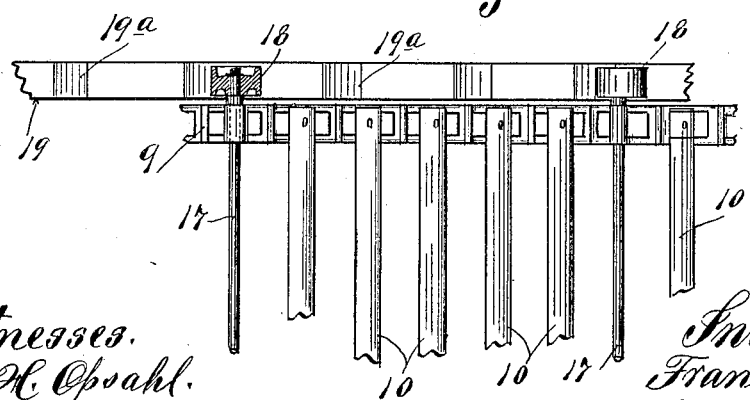
Witnesses.
A. H. Opsahl.
Malie Hoel.
Inventor.
Frank Lytle
By his Attorneys
Williamson & Merchant

UNITED STATES PATENT OFFICE.

FRANK LYTLE, OF MINNEWAUKAN, NORTH DAKOTA.

THRESHING-MACHINE.

No. 926,201.  Specification of Letters Patent.  Patented June 29, 1909.

Application filed March 11, 1908. Serial No. 420,381.

*To all whom it may concern:*

Be it known that I, FRANK LYTLE, a citizen of the United States, residing at Minnewaukan, in the county of Benson and State of North Dakota, have invented certain new and useful Improvements in Threshing-Machines; and I do hereby declare the following to be a full, clear, and exact description of the invention, such as will enable others skilled in the art to which it appertains to make and use the same.

My invention relates to threshing machines and is particularly directed to the improvement of the so-called straw-rack and parts directly associated therewith.

To the above ends the invention consists of the novel devices and combinations of devices hereinafter described and defined in the claims.

In the accompanying drawings which illustrate the invention, like characters indicate like parts throughout the several views.

Referring to the drawings, Figure 1 is a view, partly in diagram and partly in vertical section, showing a threshing machine embodying my invention, some parts thereof being broken away. Fig. 2 is a view partly in plan and partly in horizontal section with some parts broken away, showing the improved straw-rack and associated parts. Fig. 3 is an enlarged vertical section taken on the line $x^3 x^3$ of Fig. 2; and Fig. 4 is a plan view of the parts shown in Fig. 3, some parts being broken away and some parts being sectioned.

Of the parts of the threshing machine, the numeral 1 indicates the casing, the numeral 2 the threshing cylinder, the numeral 3 the concave, the numeral 4 the grain pan, the numeral 5 the sieve-equipped shoe, the numeral 6 the fan coöperating with said shoe, and the numerals 7 and 8 the fan and stack of a pneumatic stacker, all of which parts may be assumed to be of the standard construction.

The improved straw rack is made up, as shown, of a pair of laterally spaced endless sprocket chains 9 and transverse obliquely set slats 10 that are attached, at their ends, to transversely opposite links of the said chains. These sprocket chains are arranged to run over sprockets 11, 12 and 13, which sprockets are arranged in transversely opposite pairs. The sprockets 11, 12 and 13 are secured, respectively, to transverse shafts 14, 15 and 16 that are mounted in suitable bearings in the sides of the case 1. Motion may be imparted to the sprocket chains by positively driving one of the said three shafts from any suitable running part of the machine.

At suitable intervals transversely extended rods 17 are rigidly secured to transversely opposite links of the two chains 9, with their ends projecting beyond each of the said chains and provided with loosely journaled wheels 18. These rollers 18 are arranged to run both over and under guide boards 19 that are secured to the inner surface of the sides of the machine case 1. The upper edges of these guide boards 19 are serrated or notched, as indicated at 19ª, to afford vertically zig-zagged tracks over which the upper rearwardly moving rollers 18 of the straw-rack are caused to run. The passing of these rollers over these zig-zagged tracks violently shakes the upper straw-loaded portion of the straw-rack and thus insures the shaking of all grain from the straw. The grain which is thus shaken and precipitated from the straw falls onto a forwardly inclined imperforate deck 20, over which the running portion of the straw-rack runs, as best shown in Fig. 3, so that the returning slats 10 serve to scrape the grain from this deck backward and forward onto the grain pan 4, from which latter it is delivered, in the usual way, to the sieves of the shoe 5.

All the while that the straw is being carried rearward and is being violently shaken by the straw-rack, it is subjected to a blast of air delivered thereto from the two reversely acting fans 21 carried by a transverse shaft 22 mounted in bearing bars 23 secured to the outer portions of air admission ports 24, formed in the sides of the casing 1 and in which the respective fans 21 are arranged to work. Curved deflecting boards 23, secured within the casing 1, direct the blasts of air from the fans 21 rearward and above the deck 20, so that this blast of air will be caused to travel in part upward through the straw which is being carried rearward by the rack, and in part under the said body of straw to a point where it unites with the blast from the windstacker. This blast of air assists in loosening up the straw on the rack and it also serves to carry dust therefrom and from the falling grain rearward into the body of straw that is delivered to the windstacker.

The device described is of simple construction and small cost and, at the same time, is highly efficient for the purposes had in view.

What I claim is.

1. In a threshing machine, the combination with an endless traveling straw rack and means for vibrating the upper portion thereof vertically, of a pair of reversely acting fans located one on each side of said rack and opening directly into the chamber formed between the upper and lower portions of said endless rack, and inwardly and forwardly extended deflecting boards arranged to deliver the blast from said fans forward under the entire upper portion of said straw rack.

2. In a threshing machine, the combination with an endless traveling straw rack made up of sprocket chains and transverse slats, of sprockets over which said chains run, wheels carried by said chains at one side thereof, and serrated zig-zag tracks, over which said wheels run, on the upper portion of said chains, to vertically vibrate the loaded upper portion of said straw rack, substantially as described.

In testimony whereof I affix my signature in presence of two witnesses.

FRANK LYTLE.

Witnesses:
HARRY D. KILGORE,
F. D. MERCHANT.